Figure 1:
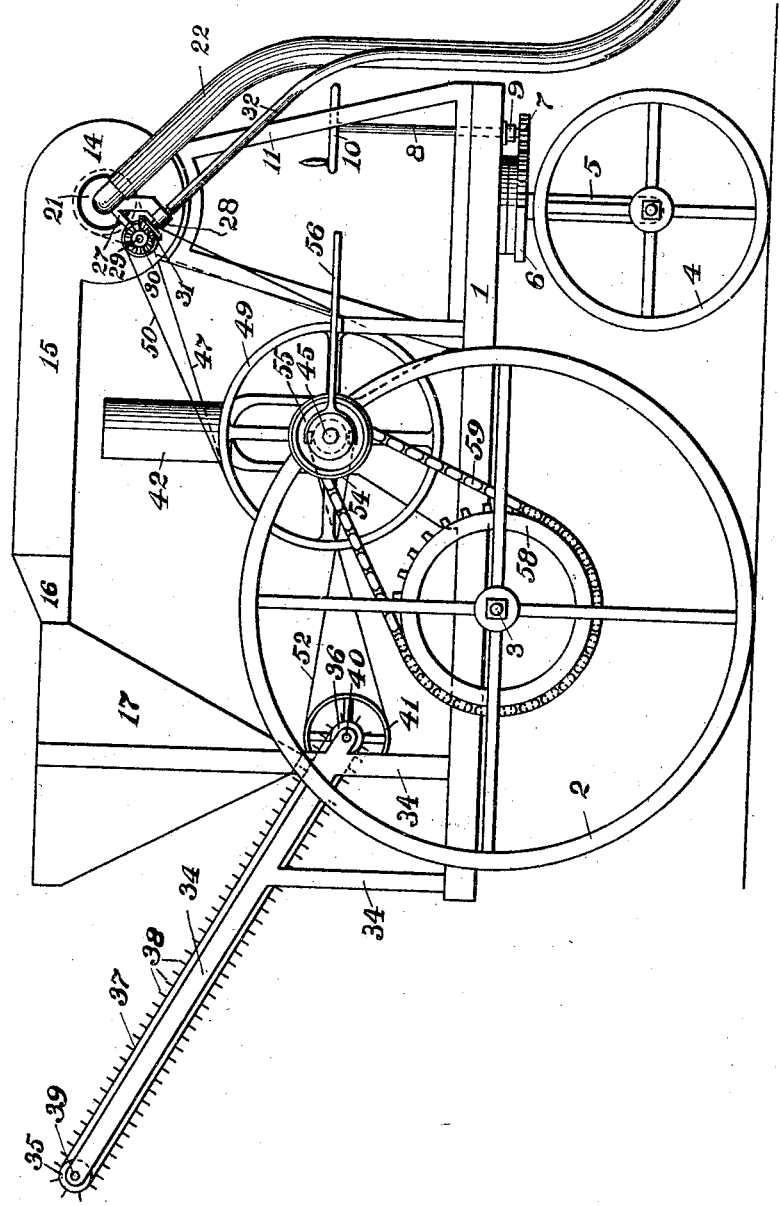

No. 812,865. PATENTED FEB. 20, 1906.
J. NISBET.
COTTON PICKING MACHINE.
APPLICATION FILED JUNE 24, 1905.

4 SHEETS—SHEET 1.

Witnesses
Inventor
Joseph Nisbet
By his Attorney
Edward P. Thompson

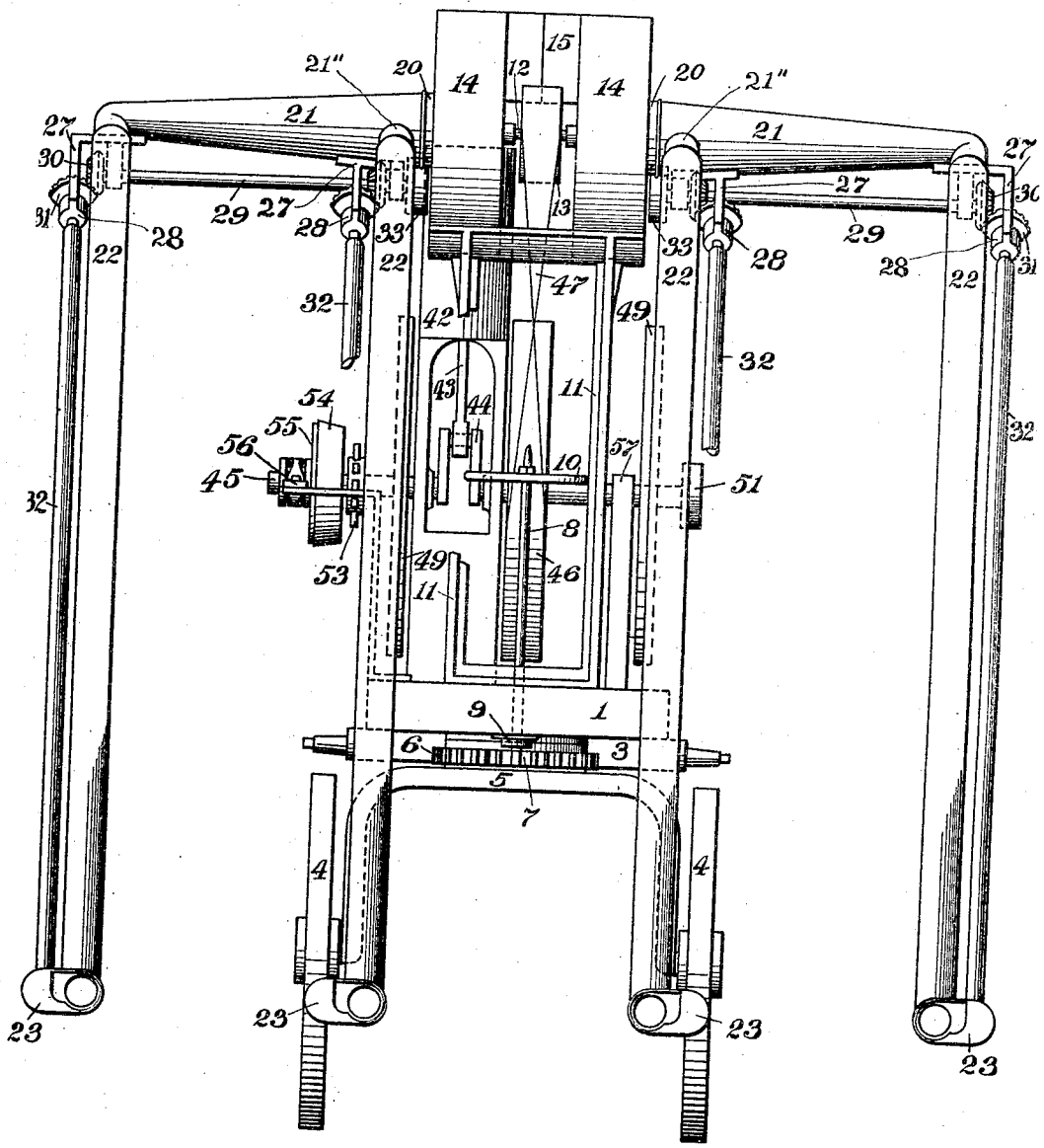

No. 812,865. PATENTED FEB. 20, 1906.
J. NISBET.
COTTON PICKING MACHINE.
APPLICATION FILED JUNE 24, 1905.
4 SHEETS—SHEET 3.
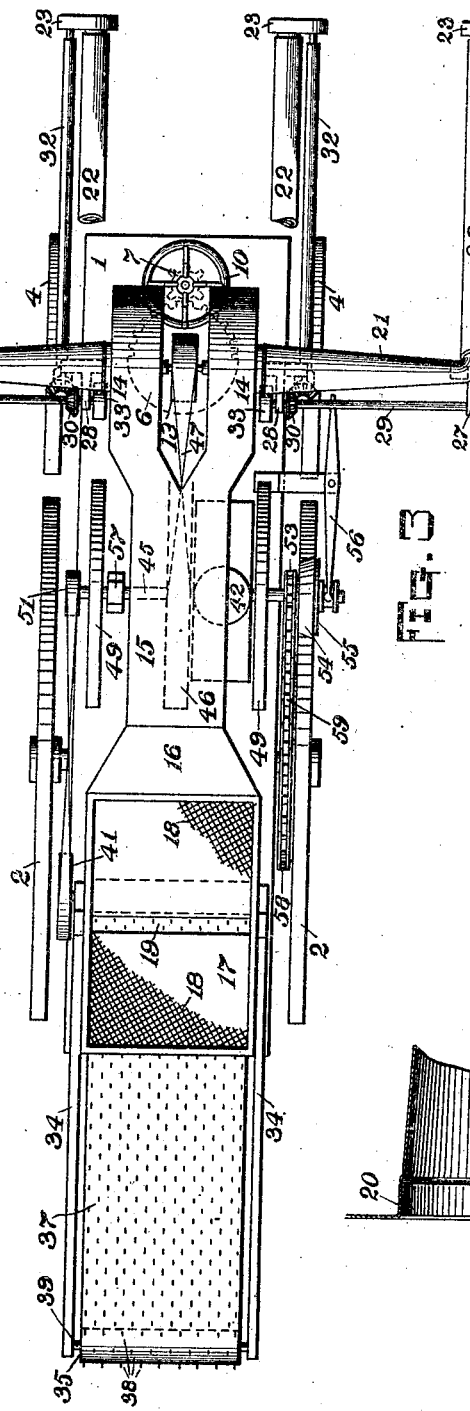
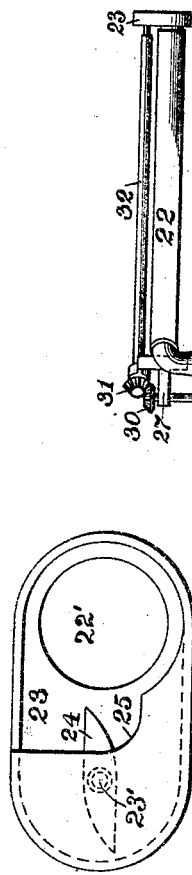
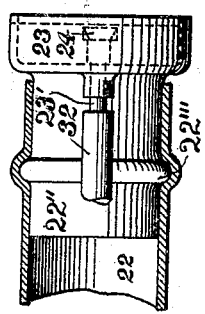
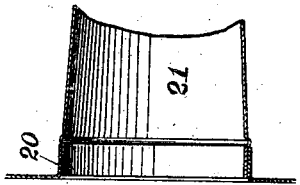
Witnesses
Inventor
Joseph Nisbet
By his Attorney
Edward P. Thompson

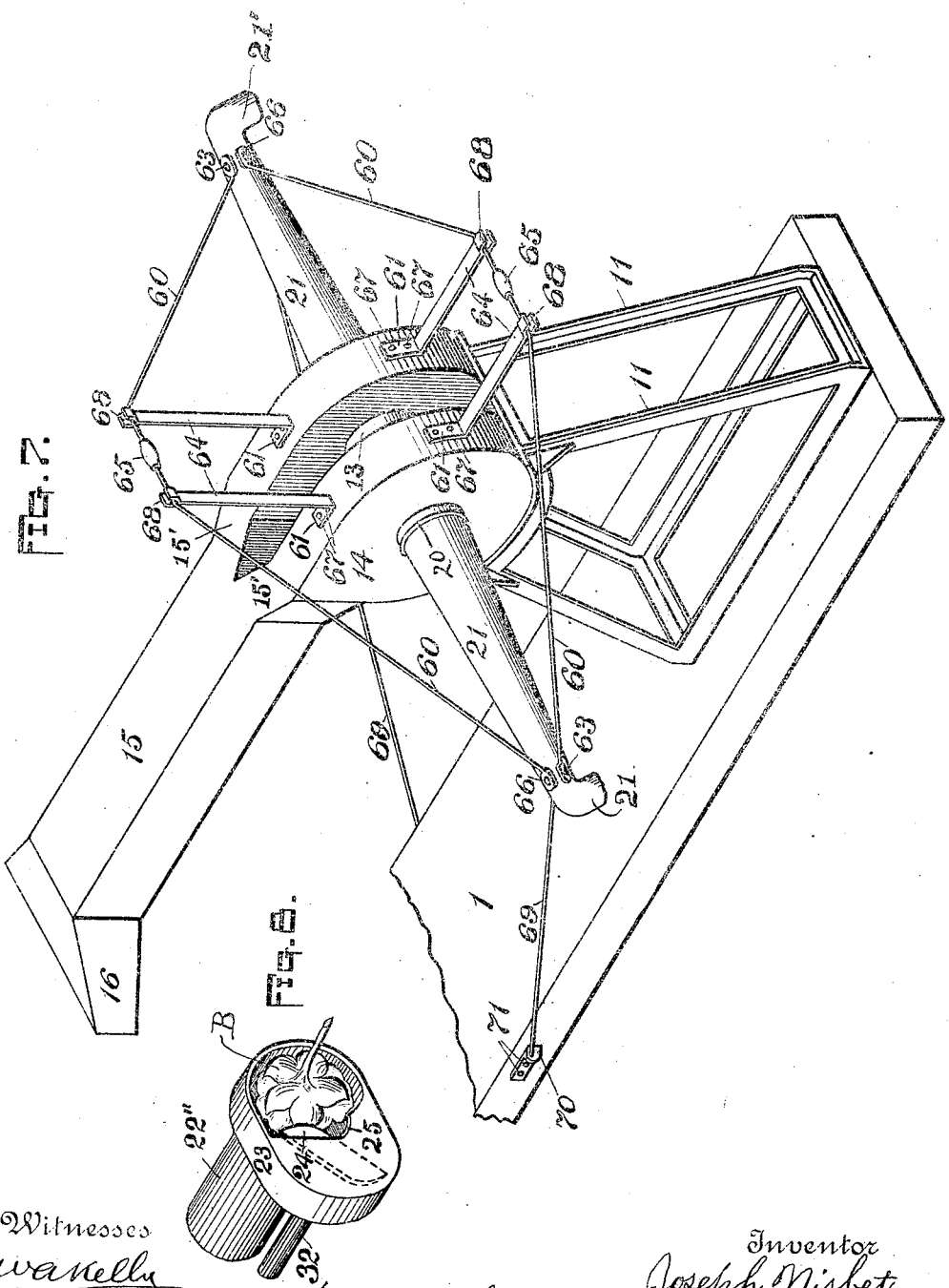

UNITED STATES PATENT OFFICE.

JOSEPH NISBET, OF ARGO, MISSISSIPPI.

COTTON-PICKING MACHINE.

No. 812,865.　　　Specification of Letters Patent.　　Patented Feb. 20, 1906.

Application filed June 24, 1905. Serial No. 266,835.

*To all whom it may concern:*

Be it known that I, JOSEPH NISBET, a citizen of the United States of America, and a resident of Argo, in the county of Winston and State of Mississippi, have invented certain new and useful Improvements in Cotton-Picking Machines, of which the following is a specification.

My invention relates generally to a self-propelled machine for picking and sorting cotton, for picking it from several rows at the same time, and for accomplishing these steps very rapidly.

The general nature of the organization, without regard to the various scopes of novelty which are attended to in the claims hereinafter annexed, comprises fan-casings facing each other, a bifurcated discharge-duct communicating with the casings at the peripheries thereof, receiving-pipes projecting from the casings in opposite directions, and suction-pipes trapped upon said receiving-pipes, said pipes tapering outward from the casings, tapering rings on the casings and fitting around said pipes, truss-rods provided with feet at their outer ends by means of which they are attached to the outer ends of said pipes, queen-posts having feet attached to the respective fan-casings and having forked outer ends through which said truss-rods pass, turnbuckles between the posts for tightening said truss-rods, a hopper communicating with that end of the duct farthest from said casings and having an opening at the base, a netting over the upper large end of said hopper, an endless belt with spikes passing beneath said opening for receiving cotton and foreign matter from said fan-casings, suction-tubes being provided for delivering cotton and any foreign matter into said fan-casings, suction-tubes extending from said pipes, each tube having a mouth, a casing extending laterally to said mouth and closed except at the mouth, and a blade pivoted and rotating so that either end of the blade is first at the mouth and then in the casing, said casing being large enough to allow some of the severed cotton to be taken circularly through the casing and then to the mouth of the suction-pipe, and a flexible shaft rotating said blade.

Figure 1 is a side elevation of the organization to show the general relation of the leading elements by a side elevation. Some parts not shown in this figure are apparent from other figures. Dotted lines represent hidden parts. Fig. 2 is a front end elevation of the same machine, dotted lines representing hidden parts and some of the material being broken off for exhibiting as much as possible in one figure. The large driving-wheels and sprocket-wheel are omitted and certain other parts. Fig. 3 is a plan of the same machine, some portions being broken away. Fig. 4 is a front end view of the nozzle of a suction-pipe on a greatly-enlarged scale as compared with that in the preceding figures. Fig. 5 is a side view of what is shown in Fig. 4, together with a flexible suction-pipe in section. Fig. 6 is a portion of one of the main suction-pipes where it joins the fan-casing. Fig. 7 is a perspective of the fan-casing construction, together with certain additions not shown in the preceding figures. Fig. 8 is a perspective of the nozzle shown in Figs. 4 and 5 in the process of operation upon a cotton-boll.

I will first describe the elements constituting the cotton-picking shears and the operation thereof in conjunction with jointly-acting elements.

At the end of each of the flexible suction-pipes 22 there is a rapidly-rotary blade 24, which, together with a cutting edge 25, forms a pair of shears contiguous to the mouth 22' of a metallic tube 22'', with the ridge 22''', over which fits the pipe 22, made, preferably, of rubber. The short tube 22'' has a lateral extension 23 forming a casing and having a pivot 23' for the blade 24, the edge 25 being on the material of this casing, which opens toward the mouth 22'. When the blade 24 is rotated continuously, first one end and then the other strikes a boll B, which is shown in Fig. 8 as approaching the shears. The boll is thoroughly dissipated, partly by the shear action and partly by impact, some of the cotton passing directly into the mouth 22' by suction and part being carried past the edge 25 into the casing after being sheared or pulled off, and then around with one end of the blade until the latter points again to the mouth 22', when the cotton is drawn from the blade by the rush of air into the suction-pipe 22. The cotton is thus quickly and thoroughly pulled from its plant, both by the picking and shearing action and by a rush of air, both of which forces are independent of each other.

The mechanism for rotating the blade 24 consists of a flexible driving-shaft 32, in each instance connected up at one end with the pivots 23' and at the other end with the bevel-wheels 31, whose bearings are 28, carried on brackets 27, which are suspended from the main tapering air-supply pipes 21. The bevel-wheels 31 are permanently engaged with the bevel-gears 30, mounted upon the shafts 29, which are driven by belts. To the inner ends of each of the shafts 29 is attached a pulley-wheel 33. Belts 50 connect the pulleys 33 to the driving-pulleys 49 of an engine, of which the cylinder is 42, the connecting-rod 43, the crank 44, and crank-shaft 45, mounted upon which are the two pulley-wheels 49.

I will next describe the elements for maintaining pressure and motion of air for forcing the cotton to the place desired.

The fans for producing the suction are inside of the casings 14; but it is sufficient to show the common shaft 12 for both fans and the driving-pulley 13 for the shaft. This pulley is driven by the engine-pulley 46 through a belt 47. The two fan-casings 14 are connected to a bifurcated discharge-duct 15; the bifurcation being shown by the branches 15' on one end of the duct 15.

16 is a discharge-nozzle vertically reduced in dimension and laterally extended in both directions for feeding the hopper 17, the top of which is covered with wire-netting 18, which is shown partly broken away for the purpose of exposing to view the elongated exit 19 at the base of the hopper, which is carried upon a frame 34, standing on the bed 1 of the vehicle. The frame 34 also carries rollers 35 and 36 for an endless belt 37, having spikes 38 standing perpendicularly on the belt. The shafts for the rollers are 39 and 40, the latter one being extended at one end to support a pulley 41, which is belted to a pulley 51 on the engine by the belt 52.

The inlet-ports of the casings 14 are bounded by short flanges 20, within which the larger ends of the conical pipes 21 are fitted. As the weight of these pipes and their adjuncts is great, they should be braced. They are accordingly supported at the top and front by truss-rods 60, provided with feet 66 at their outer ends, by means of which they are connected to the suction-pipes 21 by rivets 63. The inner ends of the truss-rods pass over the outer ends of the queen-posts 64 and each pair of rods is joined by a turn-buckle 65. The feet 61 of the queen-posts are riveted by rivets 67 to the fan-casings 14. The outer ends of the queen-posts 64 have forks 68 for receiving the truss-rods. By this construction the main pipes 21 in use may be subjected to heavy strains without danger of slipping from the fan-casings.

The suction-tubes 22 communicate with the main pipe 21 by being slipped over the bent ends 21' and the taps 21". The main pipes themselves are rigid, but the branch tubes 22 are flexible, so that the nozzles thereof may be easily directed to the cotton-bolls When the cotton has been separated in the manner already described, it is carried along by the air through the pipes 21, the duct 15, the discharge-duct 16, and the hopper 17, whence the air may escape through the netting 18, while the cotton falls down the hopper 17 and is successively caught by the traveling spikes 38, where an operator may pick out any foreign matter. The wheels 2 and 4 should move across the field, straddling one of the rows of cotton-plants. Therefore four rows may be operated upon by the machine shown in Figs. 2 and 3, where there are four pipes 22. Any pipe unused should be plugged to make the other pipes correspondingly more efficient. The rear wheels 2 are journaled upon a rigid axle 3 and are connected up with the engine by a sprocket-chain 59, a sprocket-wheel 58 on the axle 3, and by a sprocket-pinion 53 on the engine. There is a clutch for the sprocket-pinion 53, and it consists of a member 54, rigidly attached to the pinion 53, and of a movable member 55, adapted to slide upon a spline, which is on the shaft of the engine.

The front wheels 4 are on a swiveling axle 5, which is provided with a fifth-wheel 6, having teeth upon its front periphery meshing with a pinion 7, attached to a shaft 8, which passes through a bearing 9 and is provided with a steering-wheel 10 at the top for changing the direction of travel of the self-propelled vehicle.

In my improvement the force of the engine through the mechanical shafts and gearing is positive and unyielding. Any cotton caught between the rotating blade and the casing would either be cut off by the shearing action or carried along, but the blade 24 would not stop. The force driving it is many times greater than any resistance that could be offered by cotton.

I claim as my invention—

1. In a cotton-picking machine, the combination of a suction-tube, a casing at the end thereof with an opening at the mouth of said tube, and shears with their cutting edges near the mouth of said tube and the opening of said casing.

2. In a cotton-picking machine, the combination of a suction-tube having a mouth for receiving cotton from the boll, and shears located adjacent to said mouth for assisting in separating the cotton from the plant.

3. In a cotton-picking machine, the combination of a suction-tube having a mouth for receiving cotton from the boll, shears located adjacent to said mouth for assisting in separating the cotton from the plant, and means for continuously operating said shears.

4. In a cotton-picking machine, the combination of a suction-tube having a mouth for receiving cotton from the boll, shears located adjacent to said mouth for assisting in separating the cotton from the plant, an engine for driving the machine, and mechanism connected up between the machine and the movable blade of the shears.

5. In a cotton-picking machine, the combination of a suction-tube, a casing at the end thereof with an opening at the mouth of said tube, and shears with their cutting edges near the mouth of said tube and the opening of said casing, one blade of the shears being movable relatively to the casing and the cutting edge of the other blade being formed upon said casing.

6. In a cotton-picking machine, the combination of a suction-tube having a mouth for receiving cotton from the boll, shears located adjacent to said mouth for assisting in separating the cotton from the plant, an engine for driving the machine, and mechanism connected up between the machine and the movable blade of the shears, said mechanism consisting of gearing, a flexible shaft connecting said gearing and one of the blades of said shears, and a driving connection between said engine and said gearing.

7. In a cotton-picking machine, the combination of a suction-tube having a mouth for receiving cotton from the boll, shears located adjacent to said mouth for assisting in separating the cotton from the plant, an engine for driving the machine, mechanism connected up between the machine and the movable blade of the shears, said mechanism consisting of gearing, a flexible shaft connecting said gearing and one of the blades of said shears, a driving connection between said engine and said gearing, a fan-casing, a pipe extending therefrom, and brackets attached to said pipe and supporting said gearing, said pipe communicating with said suction-tube.

8. In a cotton-picking machine, the combination of a pneumatic tube, a casing at the end thereof, with an opening at the mouth of said tube, and shears with their cutting edges near the mouth of said tube and the opening of said casing.

In witness whereof I have hereunto set my hand this 20th day of June, 1905.

JOSEPH NISBET. [L. S.]

Witnesses:
  H. H. RODGERS,
  G. B. WOODWARD.